(12) United States Patent
Aota et al.

(10) Patent No.: US 7,661,575 B2
(45) Date of Patent: Feb. 16, 2010

(54) FRICTION STIRRING-WELDING METHOD

(75) Inventors: Kinya Aota, Hitachi (JP); Masahisa Inagaki, Hitachi (JP); Satoshi Hirano, Hitachi (JP); Kazutaka Okamoto, Novi, MI (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/463,906

(22) Filed: May 11, 2009

(65) Prior Publication Data

US 2009/0218033 A1 Sep. 3, 2009

Related U.S. Application Data

(63) Continuation of application No. 10/560,225, filed as application No. PCT/JP2004/008580 on Jun. 11, 2004, now abandoned.

(30) Foreign Application Priority Data

Jun. 12, 2003 (JP) ............................. 2003-167242

(51) Int. Cl.
*B23K 20/12* (2006.01)
(52) U.S. Cl. ..................... 228/112.1; 228/2.1
(58) Field of Classification Search ........................ None
See application file for complete search history.

(56) References Cited

U.S. PATENT DOCUMENTS

| 6,045,028 | A  | 4/2000  | Martin et al.   |
|-----------|----|---------|-----------------|
| 6,053,391 | A  | 4/2000  | Heideman et al. |
| 6,325,273 | B1 | 12/2001 | Boon et al.     |
| 6,543,670 | B2 | 4/2003  | Mahoney         |
| 6,739,495 | B2 | 5/2004  | Okamura et al.  |
| 6,843,405 | B2 | 1/2005  | Okamoto et al.  |
| 6,908,690 | B2 | 6/2005  | Waldron et al.  |
| 6,936,332 | B2 | 8/2005  | Aota et al.     |
| 7,156,275 | B2 | 1/2007  | Larsson         |
| 2001/0038028 | A1 | 11/2001 | Iwashita     |
| 2002/0092885 | A1 | 7/2002  | Ezumi et al. |
| 2003/0102354 | A1 | 6/2003  | Okamura et al. |
| 2003/0111514 | A1 | 6/2003  | Miyanagi et al. |
| 2005/0145678 | A1 | 7/2005  | Murakami     |
| 2005/0242158 | A1 | 11/2005 | Bolser       |

(Continued)

FOREIGN PATENT DOCUMENTS

EP 1498210 1/2005

(Continued)

*Primary Examiner*—Kiley Stoner
(74) *Attorney, Agent, or Firm*—Antonelli, Terry, Stout & Kraus, LLP

(57) ABSTRACT

A friction stirring-welding method capable of increasing the welding strength of a lap joint. A welding tool (1) comprises a small diameter projected part (2) at the tip of a shoulder (3). The welding tool is press-fitted to the upper plate (4) of the lap joint while being rotated. By a friction stirring action, an upper plate side welding boundary surface (6) plastically flows, a surface oxidation film on a lapped surface is peeled off, and the boundary surface is activated to provide an excellent welding part. Also, since the welding tool is formed in a shape having the small diameter semispherical projected part (2) at the tip thereof, the thickness (12) of an upper plate welding part is increased, and a lap joint part with high welding strength can be provided.

28 Claims, 8 Drawing Sheets

U.S. PATENT DOCUMENTS

2006/0086775 A1  4/2006  Trapp et al.

FOREIGN PATENT DOCUMENTS

| | | |
|---|---|---|
| GB | 2306366 | 5/1997 |
| JP | 10-230376 | 9/1998 |
| JP | 11-058040 | 3/1999 |
| JP | 2000-153374 | 6/2000 |
| JP | 2001-314981 | 11/2001 |
| JP | 2001-314982 | 11/2001 |
| JP | 2001-321967 | 11/2001 |
| JP | 2002-066760 | 3/2002 |
| JP | 2002-126881 | 5/2002 |
| JP | 2003-136256 | 5/2003 |
| JP | 2003-260573 | 9/2003 |
| JP | 2003-275876 | 9/2003 |
| JP | 2004-174508 | 6/2004 |

FRICTION STIRRING-WELDING METHOD

This application is a Continuation application of application Ser. No. 10/560,225, filed Dec. 12, 2005, now abandoned, the contents of which are incorporated herein by reference in their entirety. Prior application Ser. No. 10/560,225 is a National Stage application filed under 35 USC 371 of International Application No. PCT/JP04/008580, filed Jun. 11, 2004.

FIELD OF THE INVENTION

The present invention relates to a friction stir welding method and a friction stir welding apparatus.

DESCRIPTION OF RELATED ART

A conventional technology for welding of a lap joint by means of the friction stir welding technique includes a method of using a welding tool having a flat-shaped tip end surface, or a welding tool having a recess on a tip end surface, and pressing the welding tool into one of members to cause friction stir on the one of the members to make use of plastic flow produced thereby to weld the same to the other of the members (see, for example, JP-A-2001-314 981)

In welding of a lap joint by means of friction stir welding, it is important to remove a surface oxide film on a lapped surface to activate a boundary interface. Therefore, it is necessary to heighten pressure of plastic flow.

It is an object of the invention to provide a friction stir welding method for a lap joint, by which a welded part can be made higher in strength than that in the related art. Also, it is an object of the invention to provide a friction stir welding method capable of welding different metals.

In the case where welding tools are pressed into both of an upper plate and a lower plate in lap welding by means of friction stir welding, there is caused an unfavorable problem in terms of outward appearance that a large hole is formed in a welded part to reach the lower plate. Also, in case of lap welding of materials, such as aluminum and nickel, which are considerably different in melting point from each other, there is caused a problem that the both are considerably different in deformation resistance from each other and cavity flaw is generated, since aluminum has the melting point of 660° C. while nickel has the melting point of 1455° C., and welding tools are pressed into both metals of aluminum and nickel. The invention provides a welding method that dissolves the problem.

BRIEF SUMMARY OF THE INVENTION

There are two kinds of mechanisms of welding in the invention.

A first mechanism of welding resides in a method of pressing a welding tool only into one of members while rotating the welding tool, causing plastic flow of that member, which is discharged to an outer periphery of the pressed welding tool, so that welding boundary surfaces are activated by such discharge to achieve welding. A shape of the welding tool and characteristics of plastic flow are important for welding.

The invention with respect to the first mechanism of welding obtains favorable results by the use of a welding tool having a small diameter projected part at a tip end of a large diameter shoulder. Desirably, the projected part has a smooth curved surface like a semispherical shape, if possible. Since the projected part can raise pressure in a region of plastic flow, the action of activating welding boundary surfaces increases.

For an increase in pressure of plastic flow, it is also effective to provide a semispherical recess around the semispherical projected part to make these regularities contribute to an increase in contact area of the welding tool and a welding member. Also, it is desirable to round an outer peripheral surface of a tip end of the shoulder. Furthermore, since the use of a welding tool having a tip end of a certain radius of curvature also enables an increase in pressure of plastic flow, the action of activating welding boundary surfaces increases. When the action of activating welding boundary surfaces increases, a welding area increases and the welding strength increases.

A second mechanism of welding resides in a method of making a contact angle between a welding tool and a surface of an upper plate an acute angle to perform welding in case of pressing a welding tool only into one of members while rotating the welding tool. In this case, since little metal undergoing plastic flow is discharged, it is possible to make pressure of plastic flow very high. Therefore, the action of activating welding boundary surfaces increases. Such plastic flow is generated mainly in a direction, in which the welding tool rotates.

In the invention with respect to the second mechanism, a contact angle is made an acute angle by pressing of a welding tool having a semispherical shaped tip end only into one of members and causing friction stir to achieve welding. Thereby, since plastic flow is increased in internal pressure, the action of activating welding boundary surfaces increases.

When lapped surfaces of welding members are coated with soft metal, surface oxide films on welding boundary surfaces can be made easy to remove. In the case where welding members are made of carbon steel, such method is very effective. Nickel, zinc, and copper are especially effective as soft metal.

By providing a trapezoidal member on a surface of that member, into which a welding tool is pressed, or working the member to make the same trapezoidal in shape, it is possible to prevent reduction in welding strength even when an indentation is produced due to pressing of the welding tool.

Also, a distance between a welding tool and lapped surfaces can be made short by performing welding in a state wherein a groove is provided on a lapped surface of one of members, and a projected part is provided on a lapped surface of the other of the members, the projected part being fitted into the groove. This method is suited to the case where thick plates are to be welded together.

The invention is applicable to spot welding, in which a welding tool is pressed and pulled out intact and this procedure is repeated.

The invention enables moving a welding tool while performing pressing to achieve continuous welding.

With the friction stir welding method by means of a welding tool according to the invention, it is possible to positively generate plastic flow on welding boundary surfaces of a lap joint to remove and discharge a surface oxide film to activate the boundary surfaces. Thereby, welding with a high welding strength becomes possible. Also, welding of different metals is enabled.

DETAILED DESCRIPTION OF THE INVENTION

First Embodiment

Figure 1:
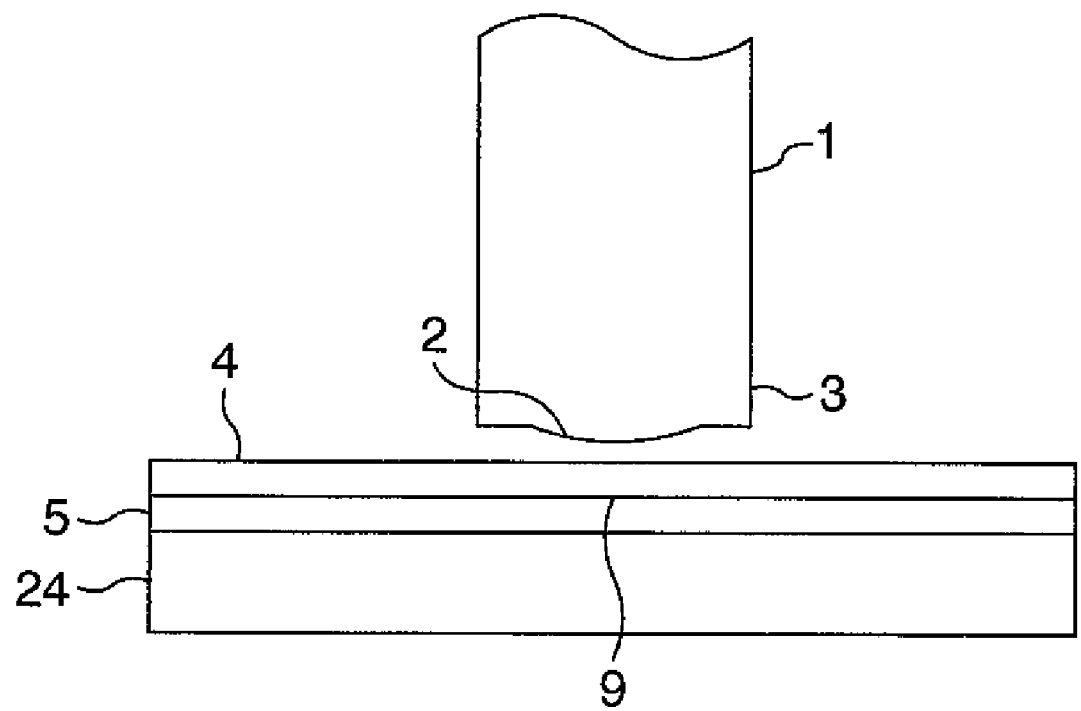
FIG. 1 is a cross sectional view showing a first embodiment.
Figure 2:
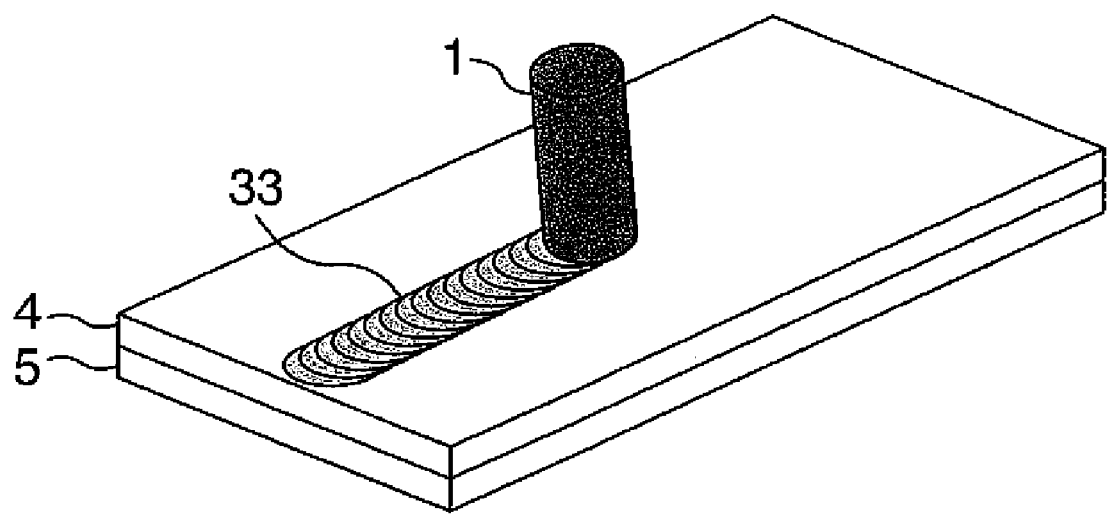
FIG. 2 is a perspective view in the course of welding in the first embodiment.
Figure 3:
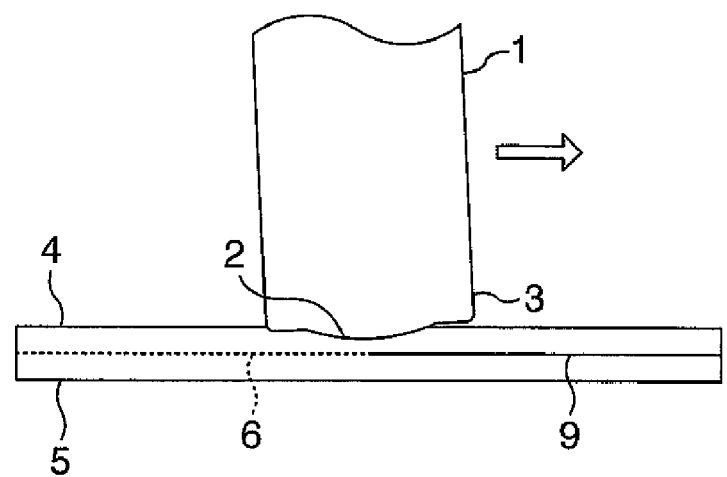
FIG. 3 is a cross sectional view showing a direction of welding in the course of welding in the first embodiment.
Figure 4:
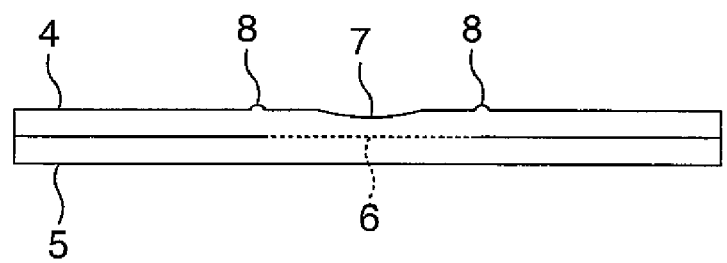
FIG. 4 is a cross sectional view showing a welded part after welding in the first embodiment.

FIG. 1 is a cross sectional view showing a first embodiment. A welding tool 1 comprises a small diameter projected part 2 at the tip end of a large diameter shoulder 3. A welding test piece comprises an upper plate 4 and a lower plate 5, which lap each other and are arranged on a bearing member 24. FIG. 2 is a perspective view in the course of welding. By rotating and moving the welding tool 1 in a direction of welding in a state, in which it is pressed only into the upper plate 4 from a side of the upper plate 4, welding boundary surfaces 6 of the upper plate 4 and the lower plate 5 can be welded to each other. An indentation 7 is produced on the upper plate 4 as the welding tool 1 is moved. FIG. 3 is a cross sectional view showing a direction of welding in the course of welding. An axis of rotation of the welding tool 1 in the course of welding is inclined on an opposite side to a direction of welding indicated by an arrow, that is, a backward angle side. FIG. 4 is a cross sectional view showing a welded part after welding. The indentation 7 corresponding to the projected part 2 of the welding tool 1 is produced centrally of a welded part 9, and discharged metal portions 8 corresponding to the indentation are produced on both ends of a surface of the welded part. At this time, surface oxide films on lapped surfaces of the upper plate 4 and the lower plate 5 are removed and the welding boundary surfaces 6 are metallically welded.

The material of the upper plate 4 according to the embodiment is an industrial pure aluminum of JIS A1050-H24, and the material of the lower plate 5 is nickel. In addition, the both plates, respectively, have a thickness of 0.4 mm. The material of the welding tool 1 is tool steel and the shoulder 3 has a diameter of 5 mm and is provided with the projected part 2, which has a height of 0.1 mm. Welding is performed by moving the welding tool 1 at the welding speed of 400 mm/min in a state, in which the welding tool is rotated at 18,000 rpm to be pressed into the upper plate 4. In addition, the axis of rotation of the welding tool 1 has a backward angle of 2.5°.

Figure 5:
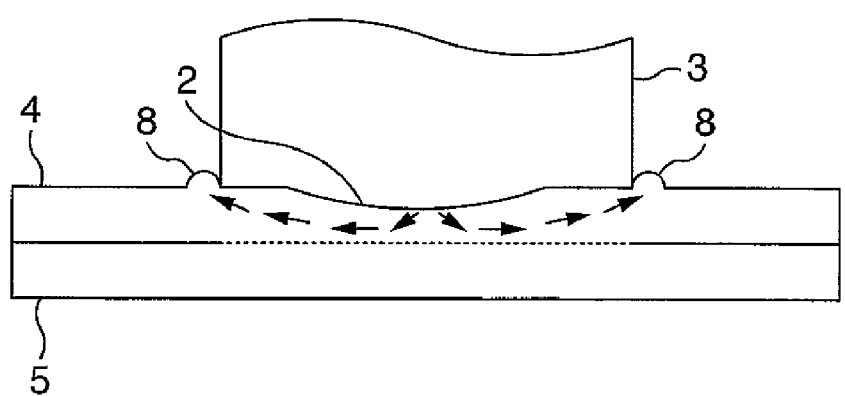
FIG. 5 is a schematic view showing a state of plastic flow in a welding part in the first embodiment.

FIG. 5 is a schematic view showing a state of plastic flow in a welding part. Since the welding tool 1 is pressed, a large load acts on the welding part in a direction of pressing. The welding part is made high in temperature by frictional heat of the welding tool 1 and the upper plate 4. Therefore, plastic flow occurs toward both ends of the welding part in a state of high pressure and high temperature. The plastic flow causes shearing stress on the welding boundary surfaces 6 of the upper plate 4 and the lower plate 5 in the welding part, so that surface oxide films on the welding boundary surfaces are removed and the both plates are metallically welded. Metal corresponding to the indentation 7 forms the discharged metal portions 8.

Welding can be performed whether the materials of the upper plate 4 and the lower plate 5 are the same metal or different metals. The welding is suited especially to the case where metals, such as aluminum, lead, tin, magnesium, etc., having low melting points are welded to each other, or one of the metals and a different metal are welded to each other. In case of welding metals, which are greatly different in melting point from each other, to each other, a thick reaction layer is liable to be produced between the both when the welding temperature is high. In such case, welding is preferable with the upper plate 4 made of a low melting point metal whereby it is possible to make the thickness of a reaction layer to the minimum. This method is especially effective in welding of metals, such as aluminum and nickel, which are greatly different in melting point from each other. Furthermore, in the case where the upper plate 4 is made of aluminum and the lower plate 5 is made of carbon steel, it is also effective to apply nickel coating on a surface of carbon steel. The reason for this is that nickel is soft metal to be susceptible to plastic flow and a surface oxide film on a surface thereof is liable to be removed. Furthermore, the same effect can be produced for galvanizing and copper plating.

The shoulder 3 has a diameter dependent upon the thickness and material of the upper plate 4. According to the embodiment, the upper plate has a thickness of 0.4 mm while the shoulder has a diameter of 5 mm, which is 12.5 times the plate thickness. By increasing the diameter of the shoulder relative to the plate thickness, a load, with which the welding tool 1 is pushed, becomes large, so that pressure of plastic flow also increases to make it further easy to remove a surface oxide film on a welding surface. Desirably, the diameter of the shoulder is 8 to 20 times the plate thickness on that side, on which the welding tool is inserted.

Figure 6:
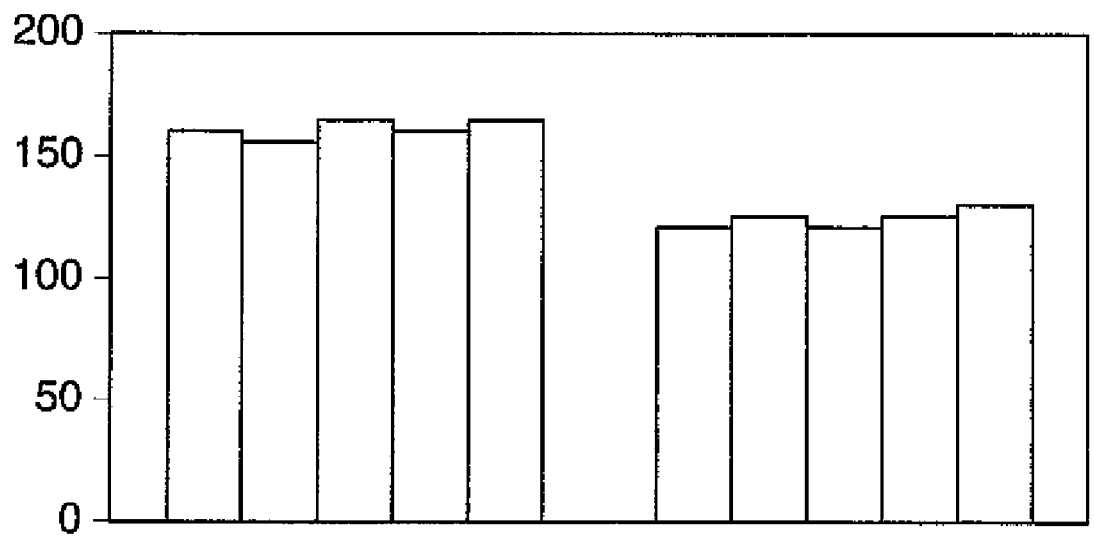
FIG. 6 is a graph illustrating shear strength of a welded part in the first embodiment.

FIG. 6 illustrates shear strength of the welded part. Test pieces of the welded part had a width of 5 mm. Since an indentation 7 was generated, shear strength was obtained by dividing a breaking load by a cross sectional area which was calculated from a plate thickness of a parent material of the upper plate 4 or the lower plate 5. While the shear strength is 155 to 165 N/mm$^2$ in the invention, it is 120 to 130 N/mm$^2$ in conventional methods. The reason for this is described below.

Figure 7:
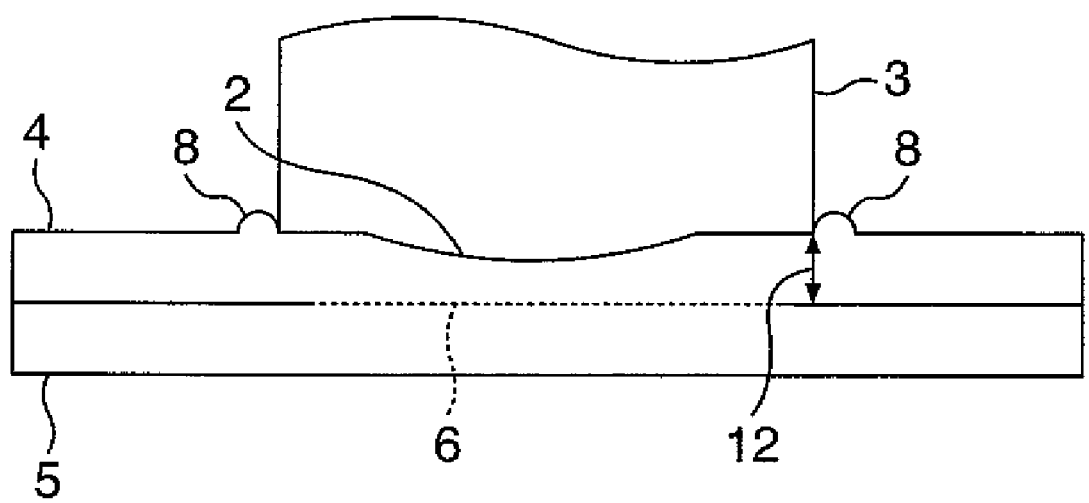
FIG. 7 is a cross sectional view showing a state in the course of welding in the first embodiment.

FIG. 7 is a cross sectional view showing a state in the course of welding in the invention. Shear strength is dependent upon the thickness 12 of an upper plate welded part.

While an indentation 7 is produced centrally of the welded part, it is not responsible for a decrease in shear strength.

Figure 8:
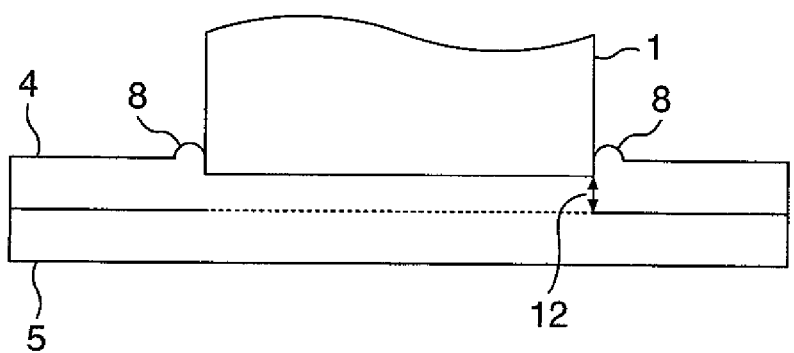
FIG. 8 is a cross sectional view showing a state in the course of welding in a conventional method.

FIG. 8 is a cross sectional view showing a state in the course of welding in a conventional method. A welding tool 1 is columnar-shaped. The welding tool 1 must be pressed deeply into a surface of an upper plate 4 in order to generate plastic flow toward both ends of a welding part to consequently produce discharged metal portions 8. Therefore, the welded part is uniformly recessed and the thickness 12 of an upper plate welded part becomes small. Therefore, shear strength becomes lower than that in the invention.

Figure 9:
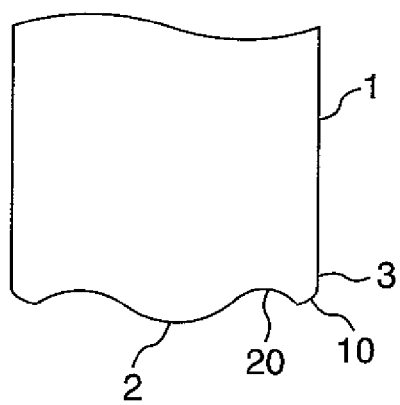
FIG. 9 is a cross sectional view showing an example of a shape of a welding tool.
Figure 10:
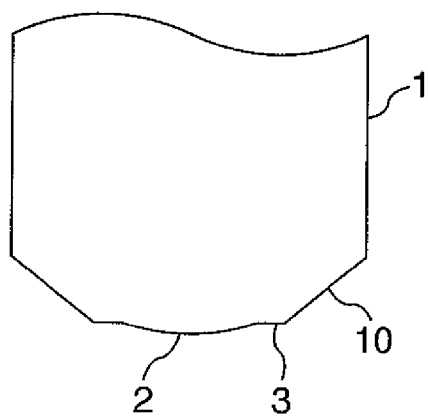
FIG. 10 is a cross sectional view showing another example of a shape of a welding tool.

FIGS. 9 and 10 show examples of a shape of a welding tool. A welding tool 1 in FIG. 9 comprises a tool end 10 having a curved surface to thereby produce an effect that discharged metal portions 8 are prevented from making burr and falling off. Furthermore, a recess 20 is provided around a projected part 2 whereby it is possible to heighten pressure of plastic flow. In FIG. 10, a tool end 10 of a welding tool 1 is inclined to define inclined surfaces. The shape of the tool is effective in restricting discharge of discharged metal portions 8 whereby there is generated an action of increasing pressure of plastic flow.

Second Embodiment

Figure 11:
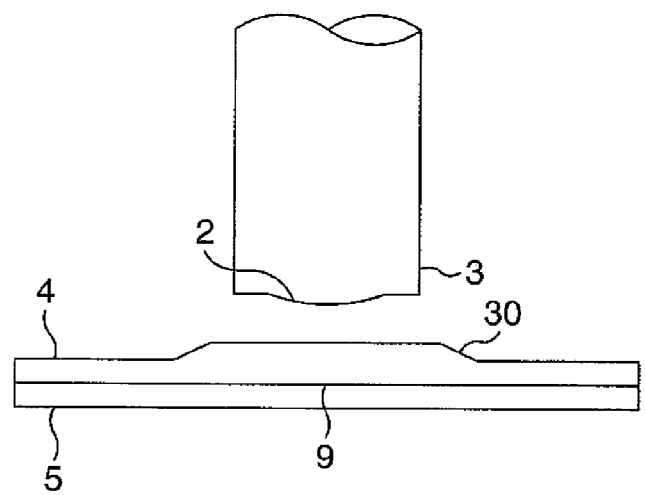
FIG. 11 is a cross sectional view showing a state before welding in a second embodiment.
Figure 12:
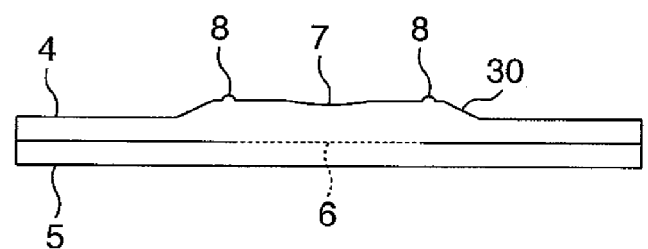
FIG. 12 is a cross sectional view showing a welded part in the second embodiment.

FIG. 11 is a cross sectional view showing a state before welding in a second embodiment. The embodiment differs from the first embodiment in that a trapezoidal member 30 is provided on a welding part of an upper plate 4 to make the upper plate 4 thick. FIG. 12 is a cross sectional view showing the welded part in the second embodiment. While an indentation 7 is produced on the welded part, any indentation does not remain and a flat surface is obtained when the welded part is ground flat.

Third Embodiment

Figure 13:
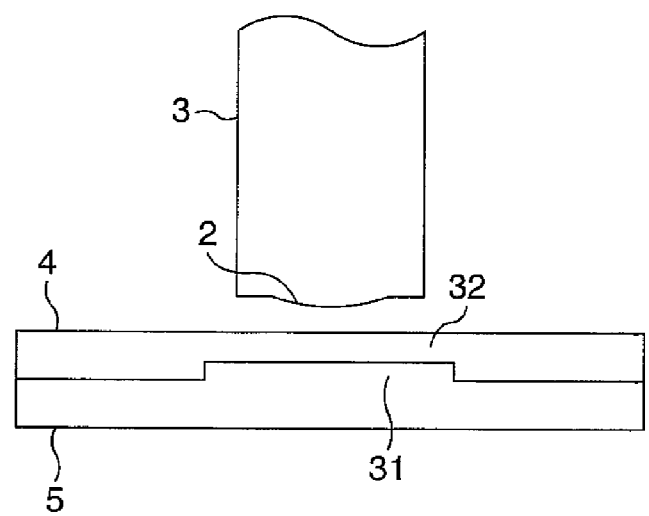
FIG. 13 is a cross sectional view showing a state before welding in a third embodiment.
Figure 14:
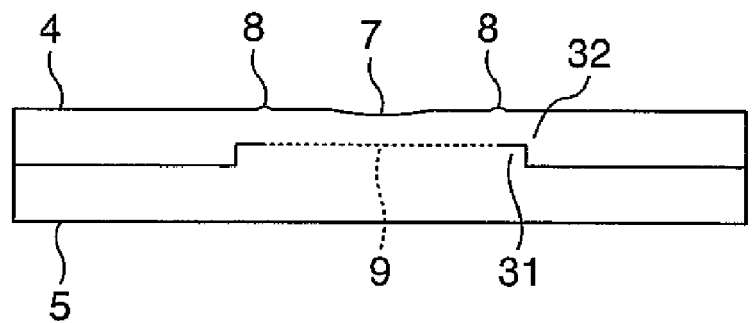
FIG. 14 is a cross sectional view showing a welded part in the third embodiment.

FIG. 13 is a cross sectional view showing a state before welding in a third embodiment. FIG. 14 is a cross sectional view showing a welded part. The embodiment differs from the first embodiment in that a groove 32 is provided on an upper plate 4 and a projected part 31 is provided on a lower plate 5 to be fitted into the groove. Thereby, since the welding part can be made smaller in thickness than the upper plate 4, it is possible to perform welding for a further large plate thickness.

Fourth Embodiment

Figure 15:
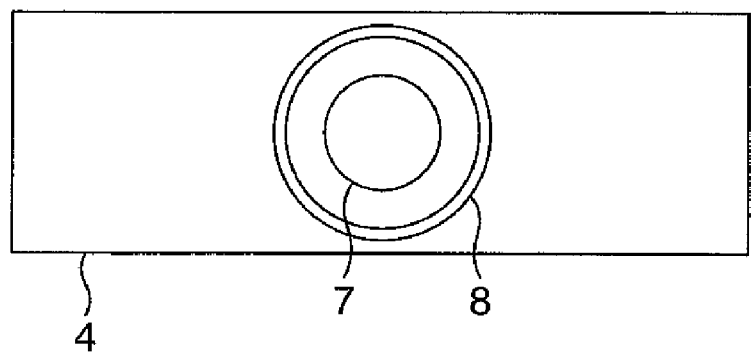
FIG. 15 is a plan view showing a state after welding in a fourth embodiment.

FIG. 15 is a plan view showing a state after welding in a fourth embodiment. In the embodiment, a welding tool 1 is pressed into an upper plate 4 and thereafter pulled up to perform spot welding. The invention is also applicable to spot welding.

Fifth Embodiment

Figure 16:
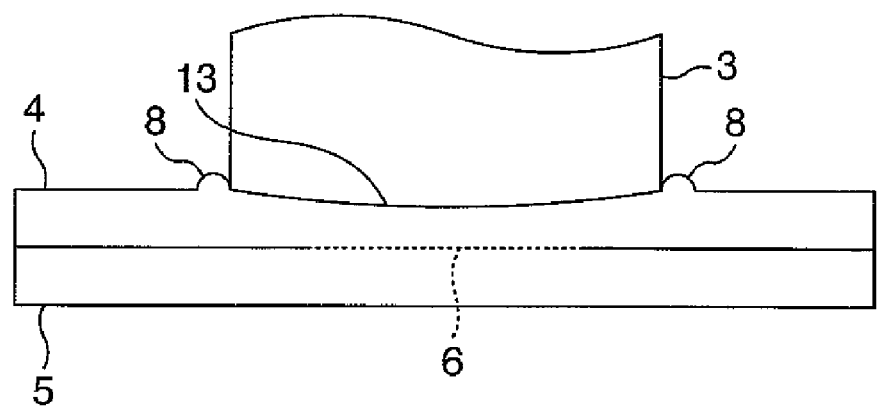
FIG. 16 is a cross sectional view showing a state in the course of welding in a fifth embodiment.

FIG. 16 is a cross sectional view showing a state in the course of welding in a fifth embodiment. An upper plate 4 is made of aluminum and has a thickness of 1 mm, while a lower plate 5 is made of carbon steel and has a thickness of 1 mm. These test pieces are caused to lap each other and a welding tool 1 is pressed from a side of the upper plate 4 while rotating. In addition, the welding tool 1 comprises a shoulder 3 having a diameter of 12 mm and a tip end of the welding tool 1 defines a semispherical shaped portion 13 having a radius of curvature of 20 mm. Since the welding tool 1 is pressed, frictional heat and pressure generated between the welding tool and the upper plate 4 cause the upper plate 1 to undergo plastic flow toward an outer peripheral side of the welding tool 1 to produce discharged metal portions 8. In the process of such discharge, plastic flow is not generated in the lower plate since carbon steel forming the lower plate 2 is high in melting point. However, a surface oxide film on a welding boundary surface of carbon steel is removed by plastic flow of aluminum and so the welding boundary surfaces 6 are activated to enable the upper plate 1 and the lower plate 2 to be metallically welded. Furthermore, since the welding tool 1 is pressed from a side of the upper plate 4 made of aluminum, the welding temperature can be made low as compared with the case where welding is performed from a side of the lower plate 5 made of carbon steel. Therefore, it is possible to obtain favorable welding characteristics for the welded boundary surfaces since generation of intermetallic compounds, which reduce the fatigue strength of a welded part, can be suppressed.

Also, since the tip end of the welding tool forms the semispherical shaped portion 13, a pressing force is large to increase an action that activates the welding boundary surfaces. Therefore, a welded area is increased to provide a large welding strength.

Sixth Embodiment

Figure 17:
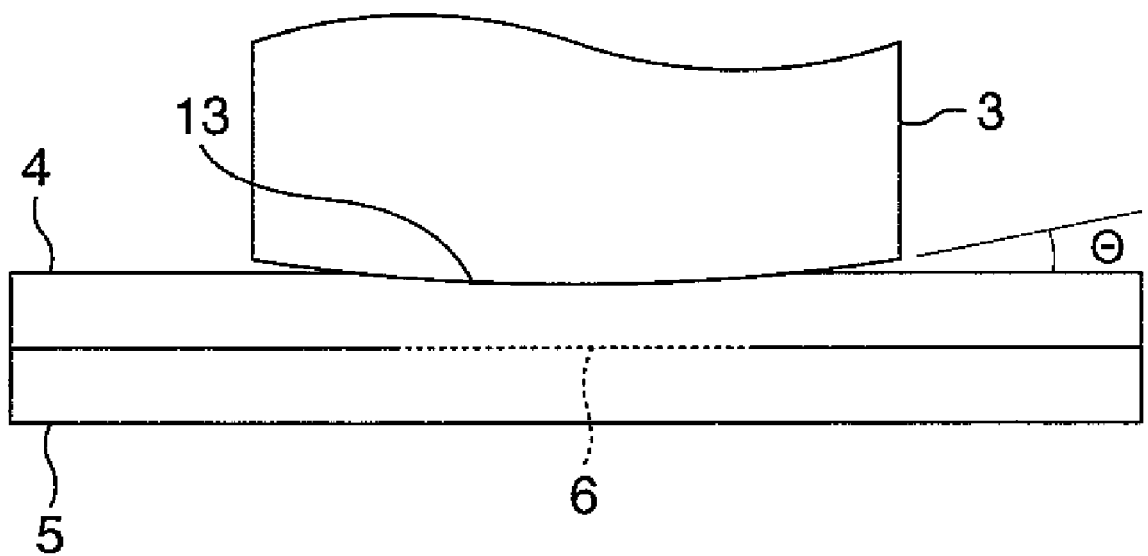
FIG. 17 is a cross sectional view showing a state in the course of welding in a sixth embodiment.

FIG. 17 is a cross sectional view showing a state in the course of welding in a sixth embodiment. An upper plate 4 and a lower plate 5 are the same in plate thickness and material as those in the fifth embodiment. However, a welding tool 1 is different in shape from that in the fifth embodiment. A shoulder 3 has a diameter of 24 mm and a tip end thereof defines a semispherical shaped portion 13 having a radius of curvature of 20 mm. Only a part of the semispherical shaped portion 13 is pressed into the upper plate to effect welding. Thereby, the upper plate 4 and the lower plate 5 can be welded together likewise. A contact angle θ between a surface of the upper plate 4 and the semispherical shaped portion 13 is very small, so that aluminum having undergone plastic flow can be restricted from making burr and falling off. Therefore, it is possible to heighten pressure of plastic flow of the welding tool 1, thus increasing an action that activates the welding boundary surfaces.

While a welding tool having a conventional shape without a curved surface has a contact angle of 90°, the welding tool according to the invention has a contact angle of approximately 10°. The contact angle is made 5 to 20° whereby it is possible to heighten pressure of plastic flow to provide for welding with a high welding strength.

Seventh Embodiment

Figure 18:
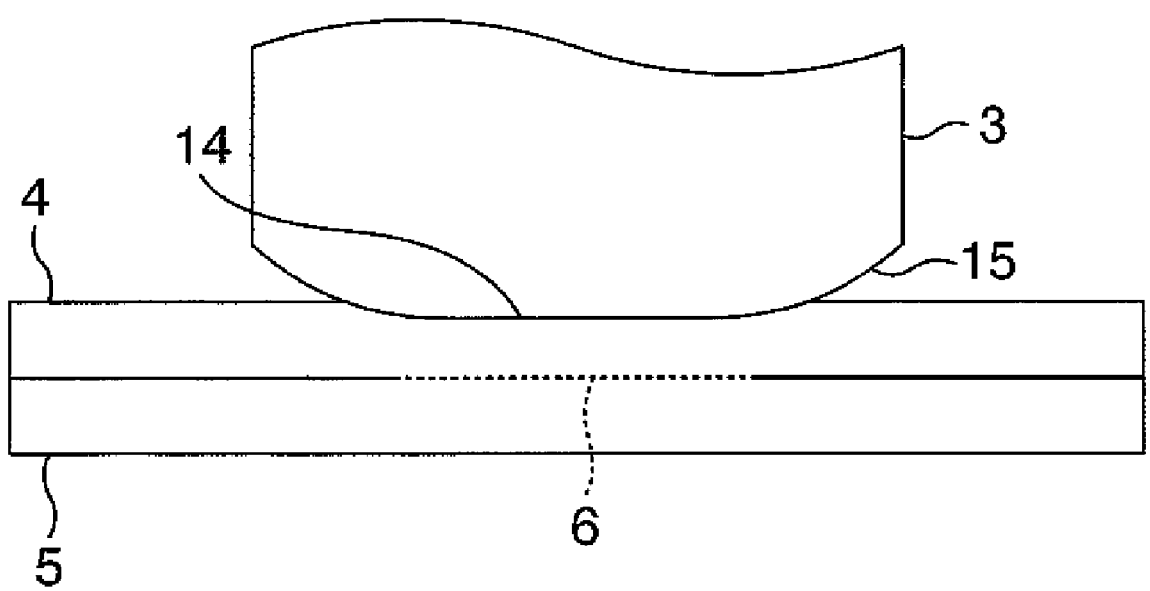
FIG. 18 is a cross sectional view showing a state in the course of welding in a seventh embodiment.

FIG. 18 is a cross sectional view showing a state in the course of welding in a seventh embodiment. An upper plate 4 and a lower plate 5 are the same in plate thickness and material as those in the fifth embodiment. However, a welding tool 1 is different in shape from that in the fifth embodiment. The welding tool has at a tip end thereof a flat portion 14, an outer periphery of which is provided with a rounded portion 15 having a radius of curvature of 20 mm. The same welding as that in the sixth embodiment is enabled by pressing only a part of the rounded portion 15 into the upper plate 4.

Eighth Embodiment

Figure 19:
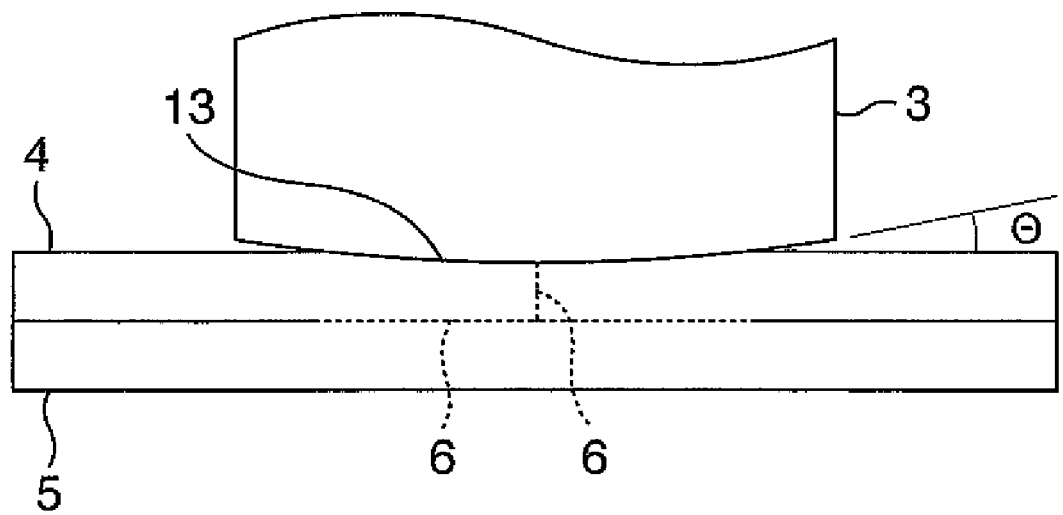
FIG. 19 is a cross sectional view showing a state in the course of welding in an eighth embodiment.

FIG. 19 is a cross sectional view showing a state in the course of welding in an eighth embodiment. Upper plates 4 are made of aluminum and have a thickness of 0.3 mm, while a lower plate 5 is made of aluminum and has a thickness of 0.5 mm. However, the upper plates 4 are butted in shape. In addition, a tip end of a welding tool 1 defines a semispherical shaped portion having a radius of curvature of 10 mm. The welding tool 1 is moved in a direction of welding while rotating at 5,000 rpm. Thereby, the upper plates 4 can be butt-welded together. In addition, after the welding, the upper plates 4 are also welded to the lower plate 5. Also, when members, such as ceramic, etc., surfaces of which are hardly activated, are used for the lower plate 5, that execution is enabled, in which only the upper plates 4 are welded but are not welded to the lower plate 5.

Ninth Embodiment

Figure 20:
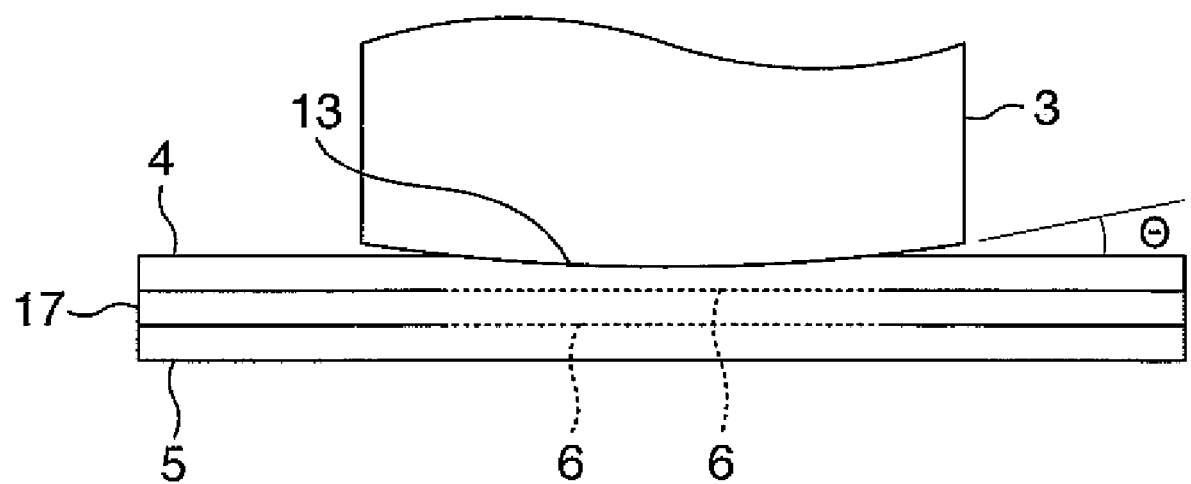
FIG. 20 is a cross sectional view showing a state in the course of welding in a ninth embodiment.

FIG. 20 is a cross sectional view showing a state in the course of welding in a ninth embodiment. Each of an upper plate 4, a middle plate 17, and a lower plate 5 is made of aluminum, and has a thickness of 0.1 mm. A welding tool 1 includes a shoulder 3 having a diameter of 5 mm and a tip end in the form of a semispherical shaped portion 13 having a radius of curvature of 10 mm. Welding of the three plates at the same time is enabled by pushing and moving the welding tool 1 at a speed of 1000 mm/min in a direction of welding while rotating the welding tool at 15,000 rpm.

What is claimed is:

1. A friction stir welding method for a lap joint, in which a plurality of members are lapped and a welding tool is pressed into one of the members, while being rotated, to cause friction stir to achieve welding, characterized in that the method comprises using, as the welding tool, a welding tool having a small diameter projected part at a tip end of a shoulder, and pressing the projected part and the shoulder of the welding tool into one of the members, wherein at least two of the plurality of members are of different metals from each other, wherein the welding tool is pressed into only said one of the members and not into a member, of the plurality of members, adjacent said one of the members, and wherein the small diameter projected part is semispherical in shape.

2. The friction stir welding method according to claim 1, characterized in that a recess is provided on the shoulder around the projected part.

3. The friction stir welding method according to claim 1, characterized in that an outer peripheral surface of a tip end of the shoulder of the welding tool is inclined to define an inclined surface.

4. The friction stir welding method according to claim 1, characterized in that an outer peripheral surface of a tip end of the shoulder of the welding tool is rounded.

5. The friction stir welding method according to claim 1, characterized in that the welding tool is pressed into only said one of the members and a welding boundary surface is activated and welded by plastic flow, in which such pressing causes material of the one of the members to be discharged to an outer periphery of the welding tool.

6. A friction stir welding method for a lap joint, in which a plurality of members are lapped and a welding tool is pressed into one of the members, while being rotated, to cause friction stir to achieve welding, characterized in that a tip end of the welding tool is semispherical in shape, said welding tool is pressed into only the one of the members, and not into a member, of the plurality of members, adjacent said one of the members, and at least two of the members are of different metals from each other.

7. The friction stir welding method according to claim 6, characterized in that only a part of the semispherical shaped portion of the welding tool is pressed into only the one of the members to make a contact angle between the welding tool and a surface of the one of the members an acute angle.

8. The friction stir welding method according to claim 6, characterized in that the welding interface is activated and welded by causing the one of the members to undergo plastic flow.

9. A friction stir welding method for a lap joint, in which a plurality of members are lapped and a welding tool is pressed into one of the members, while being rotated, to cause friction stir to achieve welding, characterized in that a tip end of the welding tool is flat and an outer peripheral surface thereof is rounded, the welding tool is pressed into only one of said plurality of members, and at least two of said plurality of members are of different metals from each other, and characterized in that the whole of the flat portion of and only a part of the rounded portion of the welding tool are pressed into only the one of the members.

10. The friction stir welding method according to claim 9, characterized in that a welding interface is activated and welded by causing the one of the members to undergo plastic flow.

11. The friction stir welding method according to claim 1, characterized in that the welding tool is pressed into only the one of the members to cause friction stir of the one of the members and then pulled out to perform spot welding.

12. The friction stir welding method according to claim 1, characterized in that the welding tool is moved in a direction of welding in a state, in which the welding tool is pressed into only the one of the members.

13. The friction stir welding method according to claim 1, characterized in that lapped surfaces of the plurality of members are coated with soft metal.

14. The friction stir welding method according to claim 13, wherein the soft metal is any one of nickel, zinc, and copper.

15. The friction stir welding method according to claim 1, characterized in that a trapezoidal member is provided on a surface of the one of the members on that side, into which the welding tool is pressed, to prevent an indentation produced due to pressing of the welding tool.

16. A friction stir welding method for a lap joint, in which a plurality of members are lapped and a welding tool is pressed into one of the members, while being rotated, to cause friction stir to achieve welding, characterized in that the method comprises using, as the welding tool, a welding tool having a small diameter projected part at a tip end of a shoulder, and pressing the projected part and the shoulder of the welding tool into one of the members, wherein at least two of the plurality of members are of different metals from each other, and wherein the welding tool is pressed into only said one of the members and not into a member, of the plurality of members, adjacent said one of the members and characterized in that one of the members is provided on a lapped surface thereof with a groove, another of the members is provided on a lapped surface thereof with a projected part, and the projected part is fitted into and welded to the groove.

17. A friction stir welding method for a lap joint, in which a plurality of members are lapped and a welding tool is pressed into one of the members, while being rotated, to cause friction stir to achieve welding, characterized in that the method comprises using, as the welding tool, a welding tool having a small diameter projected part at a tip end of a shoulder, and pressing the projected part and the shoulder of the welding tool into one of the members, wherein at least two of the plurality of members are of different metals from each other, wherein the welding tool is pressed into only said one of the members and not into a member, of the plurality of members, adjacent said one of the members, wherein said shoulder has a diameter which is 8-20 times a thickness of said one of the members into which the welding tool is pressed.

18. The friction stir welding method according to claim 6, wherein the tip end of the welding tool makes a contact angle in a range of 5°-20° with the member into which the welding tool is pressed.

19. The friction stir welding method according to claim 1, wherein the plurality of lapped members are face-to-face.

20. The friction stir welding method according to claim 6, wherein the plurality of lapped members are face-to-face.

21. The friction stir welding method according to claim 9, wherein the plurality of lapped members are face-to-face.

22. The friction stir welding method according to claim 1, wherein said welding tool is pressed into said one of the members in a thickness direction thereof, and does not extend through an entirety of the thickness of said one of the members.

23. The friction stir welding method according to claim 6, wherein said welding tool is pressed into said one of the members in a thickness direction thereof, and does not extend through an entirety of the thickness of said one of the members.

24. The friction stir welding method according to claim 9, wherein said welding tool is pressed into said one of the members in a thickness direction thereof, and does not extend through an entirety of the thickness of said one of the members.

25. The friction stir welding method according to claim 1, wherein said welding tool is pressed into said one of the members, while being rotated, so as to remove surface oxide films on welding boundary surfaces of the one of the members and the member adjacent thereto.

26. The friction stir welding method according to claim 6, wherein said welding tool is pressed into said one of the members, while being rotated, so as to remove surface oxide films on welding boundary surfaces of the one of the members and the member adjacent thereto.

27. The friction stir welding method according to claim 1, characterized in that the welding interface is activated and welded by causing the one of the members to undergo plastic flow.

28. The friction stir welding method according to claim 1, wherein the welding tool is pressed into the one of the members, while being rotated, so as to cause plastic flow mainly in a direction in which the welding tool rotates.

\* \* \* \* \*